(12) United States Patent
Wang et al.

(10) Patent No.: US 10,070,300 B2
(45) Date of Patent: Sep. 4, 2018

(54) INFORMATION EXCHANGE APPARATUS, BASE STATION AND COMMUNICATION SYSTEM

(71) Applicant: FUJITSU LIMITED, Kawasaki-shi, Kanagawa (JP)

(72) Inventors: Weiwei Wang, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 86 days.

(21) Appl. No.: 15/166,329

(22) Filed: May 27, 2016

(65) Prior Publication Data

US 2016/0277918 A1    Sep. 22, 2016

Related U.S. Application Data

(63) Continuation of application No. PCT/CN2013/088157, filed on Nov. 29, 2013.

(51) Int. Cl.
*H04W 4/00* (2018.01)
*H04W 8/02* (2009.01)
(Continued)

(52) U.S. Cl.
CPC ............. *H04W 8/02* (2013.01); *H04L 45/38* (2013.01); *H04L 61/20* (2013.01); *H04W 36/28* (2013.01);
(Continued)

(58) Field of Classification Search
CPC ........... H04W 8/02; H04L 61/20; H04L 20/62
(Continued)

(56) References Cited

U.S. PATENT DOCUMENTS

2009/0161614 A1\* 6/2009 Grandblaise .......... H04W 16/06
370/329
2010/0260109 A1   10/2010 Ulupinar et al.
(Continued)

FOREIGN PATENT DOCUMENTS

CN    102325005 A    1/2012
CN    103139911 A    6/2013
(Continued)

OTHER PUBLICATIONS

Notice of Final Rejection issued by the Korean Intellectual Property Office for corresponding Korean Patent Application No. 10-2016-7014169, dated Sep. 15, 2017, with an English translation.
(Continued)

*Primary Examiner* — Chi H Pham
*Assistant Examiner* — Alexander O Boakye
(74) *Attorney, Agent, or Firm* — Myers Wolin, LLC (57) ABSTRACT

Embodiments of the present disclosure provide an information exchange apparatus, base station and communication system. The apparatus includes: a first sending unit configured to send a request message to a secondary base station, the request message containing an uplink address of a master base station for receiving uplink data of service(s) of a user equipment in the secondary base station; and a first receiving unit configured to receive a response message fed back by the secondary base station according to the request message, the response message containing a downlink address of the secondary base station for receiving downlink data of the service(s). With this apparatus, the flow of information exchange may be simplified, and signaling overhead may be saved.

12 Claims, 6 Drawing Sheets

(51) Int. Cl.
H04L 12/721 (2013.01)
H04W 40/22 (2009.01)
H04L 29/12 (2006.01)
H04W 36/28 (2009.01)
H04W 76/16 (2018.01)
H04W 76/12 (2018.01)
H04W 76/10 (2018.01)
H04W 76/11 (2018.01)
H04W 88/16 (2009.01)

(52) U.S. Cl.
CPC ........... *H04W 40/22* (2013.01); *H04W 76/10* (2018.02); *H04W 76/11* (2018.02); *H04W 76/12* (2018.02); *H04W 76/16* (2018.02); *H04W 88/16* (2013.01)

(58) Field of Classification Search
USPC ........................................................ 370/328
See application file for complete search history.

(56) References Cited

U.S. PATENT DOCUMENTS

| | | |
|---|---|---|
| 2011/0201369 A1 | 8/2011 | Kim et al. |
| 2014/0106793 A1 | 4/2014 | Lee et al. |
| 2014/0269575 A1 | 9/2014 | Zhang et al. |
| 2014/0308921 A1 | 10/2014 | Zhang |

FOREIGN PATENT DOCUMENTS

| | | |
|---|---|---|
| CN | 103188663 A | 7/2013 |
| CN | 103188792 A | 7/2013 |
| KR | 10-2011-0094828 A | 8/2011 |
| WO | 2012/161551 A2 | 11/2012 |

OTHER PUBLICATIONS

Huawei et al.: "Solution for Reduction of Signalling Load towards Core Network", Agenda Item: 7.2.1, 3GPP TSG-RAN WG2 Meeting #83, R2-132853, Barcelona, Spain, Aug. 19-23, 2013.
Huawei et al.: "Way Forward on the Selection of UP Architecture Alternatives", Agenda Item: 7.2.2, 3GPP TSG-RAN WG2 Meeting #83, R2-132834, Barcelona, Spain, Aug. 19-23, 2013.
NTT Docomo et al: "TP to TR 36.842 on SeNB modification and release", Agenda Item: 7.2.2.1, 3GPP TSG-RAN WG2 Meeting #84, R2-134620, Revision of R2-134565, San Francisco, USA, Nov. 11-15, 2013.
Samsung: "Discussion on signaling load reduction", Agenda Item: 7.2.4, 3GPP TSG-RAN WG2 Meeting #83bis, R2-133264, Ljubljana, Slovenia, Oct. 7-11, 2013.
Extended European search report with supplementary European search report and the European search opinion issued by the European Patent Office for corresponding European Patent Application No. 13898276.4, dated Jun. 6, 2017.
Notice of Preliminary Rejection issued for corresponding Korean Patent Application No. 10-2016-7014169, dated Mar. 16, 2017, with an English translation.
Notification of Reasons for Refusal issued for corresponding Japanese Patent Application No. 2016-531659 dated Jun. 27, 2017, with an English translation.
Ericsson, "Signalling procedures for dual connectivity", 3GPP TSG-RAN WG2 Meeting #84, R2-134219, San Francisco, USA, Nov. 11-15, 2013.
NSN et al., "Handover procedure in case of bearer only served by SeNB (1A)", 3GPP TSG-RAN WG3 Meeting #82, R3-132101, San Francisco, USA, Nov. 11-15, 2013.
Notice of Preliminary Rejection issued by the Korean Intellectual Property Office for corresponding Korean Patent Application No. 10-2018-7001189, dated Apr. 5, 2018, with an English translation.
Office Action issued by the Canadian Intellectual Property Office for corresponding Canadian Patent Application No. 2,931,883, dated Oct. 25, 2017.
Notice of Second Final Rejection issued by the Korean Intellectual Property Office for corresponding Korean Patent Application No. 10-2016-7014169, dated Nov. 10, 2017, with an English translation.
Office Action issued by the Mexican Institute of Industrial Property for corresponding Mexican Patent Application No. MX/a/2016/006997, dated Jan. 11, 2018, and received Jan. 30, 2018, with an English translation.
International Search Report issued for corresponding International Patent Application No. PCT/CN2013/088157, dated Sep. 4, 2014, with an English translation.
Office Action issued by the Canadian Intellectual Property Office for corresponding Canadian Patent Application No. 2,931,883, dated Jul. 12, 2018.

* cited by examiner

INFORMATION EXCHANGE APPARATUS, BASE STATION AND COMMUNICATION SYSTEM

CROSS REFERENCE TO RELATED APPLICATIONS

This application is a continuation application of International Application PCT/CN2013/088157 filed on Nov. 29, 2013, the entire contents of which are incorporated herein by reference.

TECHNICAL FIELD

The present disclosure relates to the field of communications, and in particular to an information exchange apparatus, a base station and a communication system.

BACKGROUND

In an LTE-A (advanced long term evolution) network of Rel. 12, resource aggregation between multiple nodes permits a user to be served by at least two base stations such as a master base station (such as MeNB, Master eNB) and a secondary base station (such as SeNB, Secondary eNB), at the same time.

Figure 1:
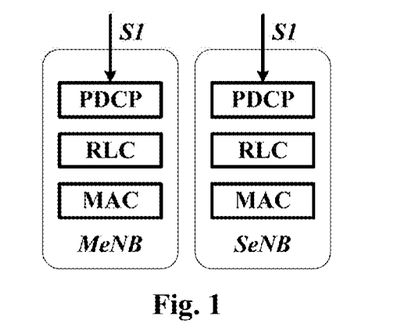
FIG. 1 is a schematic diagram of a protocol stack structure of a user plane.

In such a structure, a possible protocol stack structure of a user plane is as shown in FIG. 1, that is, different services of the user (such as evolved radio access bearers (E-RABs)) are provided by different base stations. In such a structure, when new services are to be added in the secondary base station for the user or when services that have been provided in the secondary base station are reconfigured, uplink addresses and downlink addresses of the secondary base station and a serving gateway (S-GW) for receiving and sending the services need to be mutually exchanged.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

However, in a future network structure, a base station may integrate functions of an S-GW, and if the uplink and downlink addresses are exchanged still according to an existing flow, relatively much signaling overhead will be introduced.

Embodiments of the present disclosure provide an information exchange apparatus, base station and communication system, which acquire a corresponding address from a serving gateway with no need of a mobility management entity (MME), thereby simplifying a flow of exchange and lowering signaling overhead.

According to a first aspect of the embodiments of the present disclosure, there is provided an information exchange apparatus, including:

a first sending unit configured to send a request message to a secondary base station, the request message containing an uplink address of a master base station for receiving uplink data of service(s) of a user equipment in the secondary base station; and a first receiving unit configured to receive a response message fed back by the secondary base station according to the request message, the response message containing a downlink address of the secondary base station for receiving downlink data of the service(s).

According to a second aspect of the embodiments of the present disclosure, there is provided an information exchange apparatus, including:

a second receiving unit configured to receive a request message sent by a master base station, the request message containing an uplink address of the master base station for receiving uplink data of service(s) of a user equipment in a secondary base station;

a second sending unit configured to feed back a response message to the master base station according to information contained in the request message, the response message containing a downlink address of the secondary base station for receiving downlink data of the service(s).

According to a third aspect of the embodiments of the present disclosure, there is provided a base station, including the information exchange apparatus described in the first aspect.

According to a fourth aspect of the embodiments of the present disclosure, there is provided a base station, including the information exchange apparatus described in the second aspect.

According to a fifth aspect of the embodiments of the present disclosure, there is provided a communication system, including a master base station and a secondary base station; wherein, the master base station is configured to send a request message to the secondary base station, the request message containing an uplink address of the master base station for receiving uplink data of service(s) of a user equipment in the secondary base station, and receive a response message fed back by the secondary base station according to the request message, the response message containing a downlink address of the secondary base station for receiving downlink data of the service(s);

and the secondary base station is configured to receive the request message sent by the master base station, and feed back the response message to the master base station according to information contained in the request message.

An advantage of the embodiments of the present disclosure exists in that the secondary base station may acquire a corresponding address from a serving gateway with no need of an MME, thereby simplifying a flow of exchange and lowering signaling overhead.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of the present disclosure only, and a person of ordinary skill in the art may obtain other accompanying drawings according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of the present disclosure shall be described below with reference to the accompanying drawings. These embodiments are illustrative only, and are not intended to limit the present disclosure.

Figure 2:
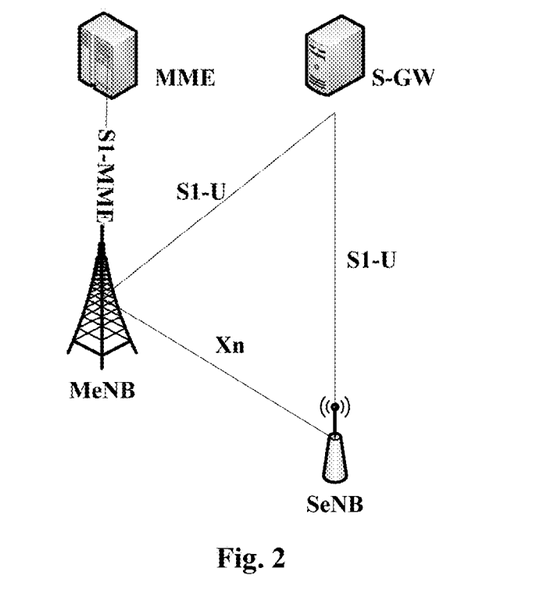
FIG. 2 is a schematic diagram of a structure of a core network.

FIG. 2 is a schematic diagram of a structure of an existing core network. As shown in FIG. 2, the structure includes a master base station (MeNB), a secondary base station (SeNB) and a serving gateway (S-GW), the S-GW being an independent network entity. When it is needed to configure services of a UE (user equipment) in the SeNB (such as adding a new service or reconfiguring an existing service), the MeNB or the SeNB needs to exchange uplink and downlink addresses with a mobility management entity (MME) and the S-GW according to the flowchart shown in FIG. 3.

Figure 3:
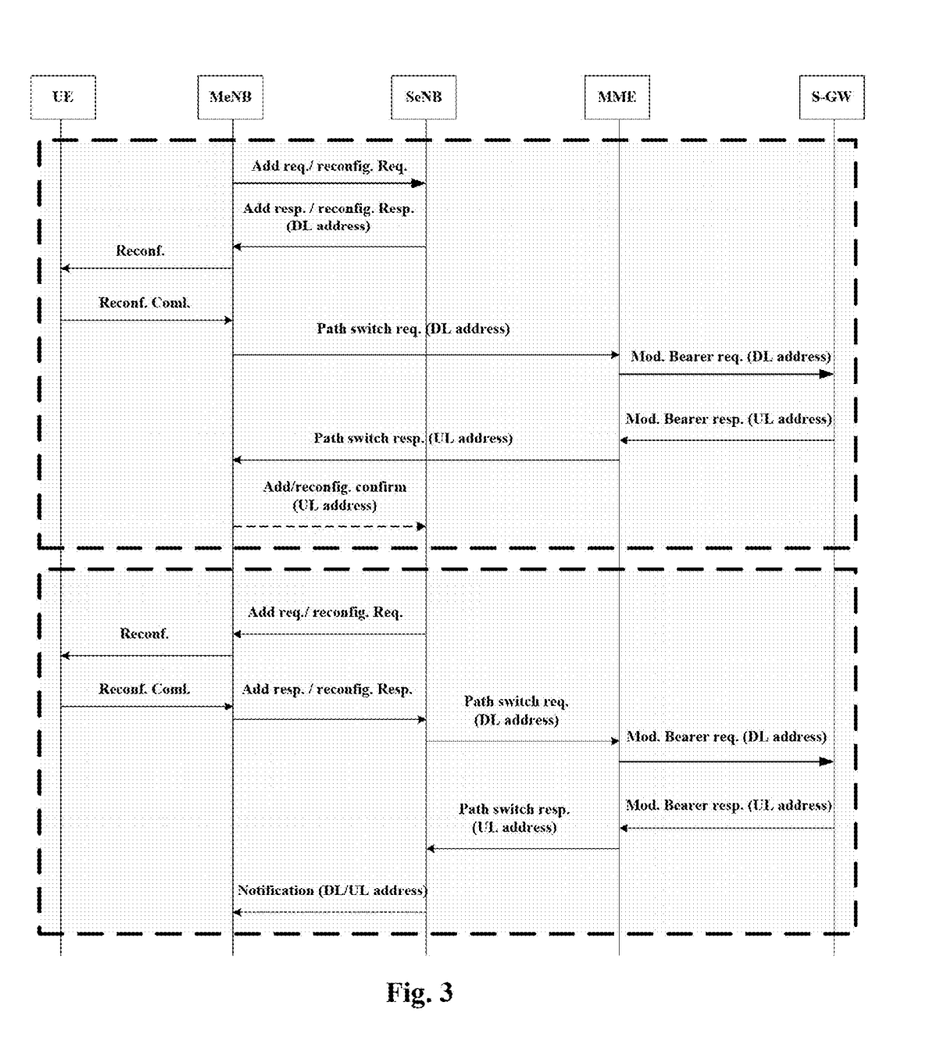
FIG. 3 is a flowchart of address exchange by the structure of the core network shown in FIG. 2.

FIG. 3 is a flowchart of uplink and downlink address exchange. As shown in FIG. 3, there are two available flows, such as the flows shown in the frames in dotted lines. In the flows, the downlink address (DL address) indicates an address in the SeNB where downlink data of corresponding services need to be sent when the S-GW sends the data to the UE. The uplink address (UL address) indicates an address in the S-GW where uplink data of corresponding services of the UE need to be sent when the SeNB sends the data. It can be seen from FIG. 3 that notification of the uplink address needs five messages, that is, a path switch request message, a modify bearer request message, a modify bearer response message, a path switch request ACK message, and an add/reconfiguration confirm or notification message.

However, when the S-GW of the SeNB is integrated into the MeNB, if the exchange of the uplink and downlink addresses is still performed according to the above flows, excessive signaling overhead will be brought.

In order to solve the above problem, embodiments of the present disclosure provide an information exchange method, which may simplify a flow of exchange and lower signaling overhead.

What needs to be specified first is that each service, such as an evolved universal terrestrial radio access network (E-UTRAN) radio access bearer (E-RAB, E-UTRAN RAB), has an uplink address in a serving gateway (S-GW) and a downlink address in a secondary base station (SeNB). The SeNB needs to learn the uplink address, so that when the SeNB is to send uplink data of services of a UE, the uplink data are sent to the address of the S-GW. And the S-GW needs to learn the downlink address, so that when the S-GW is to send downlink data of the services of the UE, the downlink data are sent to the address of the SeNB. Hence, when an uplink address and a downlink address are concerned in the embodiments, they are addresses of a certain service.

The information exchange method of the embodiments of the present disclosure shall be described below with reference to the accompanying drawings.

Embodiment 1

Figure 4:
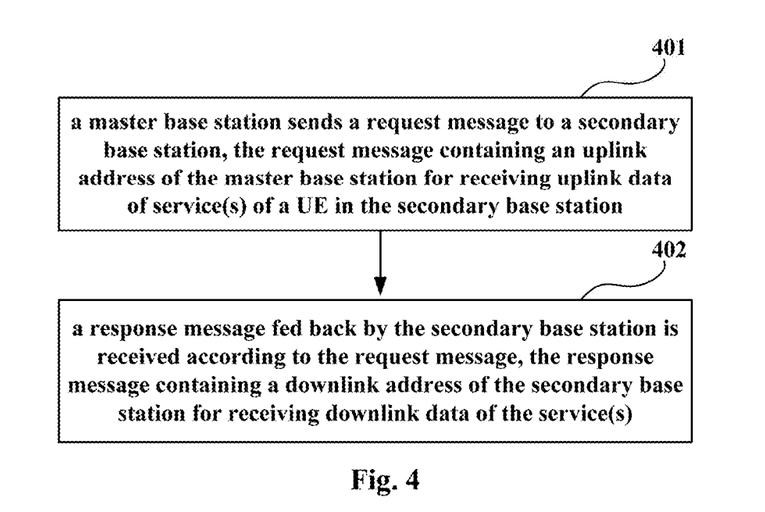
FIG. 4 is a flowchart of information exchange of Embodiment 1 of the present disclosure.

FIG. 4 is a flowchart of the information exchange method of Embodiment 1 of the present disclosure. As shown in FIG. 4, the method includes:

step 401: a master base station sends a request message to a secondary base station, the request message containing an uplink address of the master base station for receiving uplink data of service(s) of a UE in the secondary base station; and step 402: the master base station receives a response message fed back by the secondary base station according to the request message, the response message containing a downlink address of the secondary base station for receiving downlink data of the service(s).

It can be seen from the above embodiment that when an S-GW of the secondary base station is integrated into the master base station, the uplink and downlink addresses may be exchanged by using the above flow, without needing to acquire a corresponding address via an MME. In comparison with the flowchart of signaling shown FIG. 3, the flow of exchange is simplified, and signaling overhead is lowered.

In this embodiment, the method may further include: the master base station notifies the uplink address and the downlink address to an MME or the secondary base station. Hence, connection under the core network structure may be established.

In this embodiment, the uplink address and the downlink address may be notified to the MME via a notification message, and may also be notified via other messages, which shall not be described herein any further.

Furthermore, the uplink address and the downlink address may also be notified to the SeNB via the notification message, and then sent to the MME by the SeNB.

Embodiment 2

Figure 5:
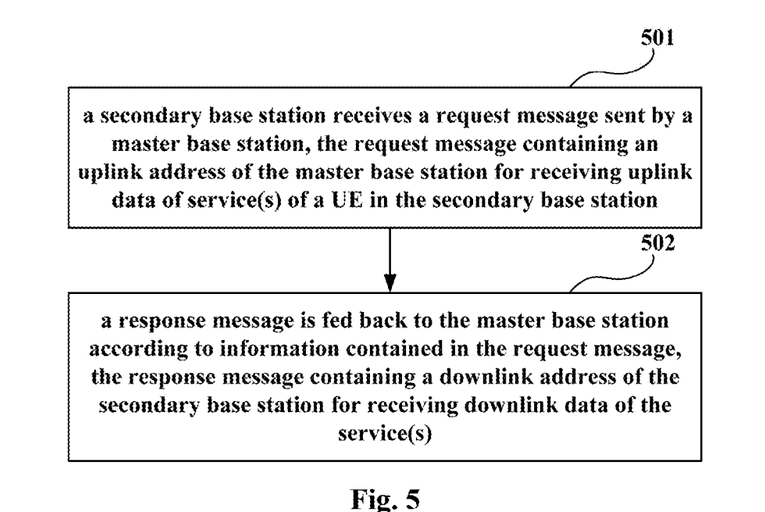
FIG. 5 is a flowchart of information exchange of Embodiment 2 of the present disclosure.

FIG. 5 is a flowchart of the information exchange method of Embodiment 2 of the present disclosure. As shown in FIG. 5, the method includes:

step 501: a secondary base station receives a request message sent by a master base station, the request message containing an uplink address of the master base station for receiving uplink data of service(s) of a UE in the secondary base station; and step 502: the secondary base station feeds back a response message to the master base station according to information contained in the request message, the response message containing a downlink address of the secondary base station for receiving downlink data of the service(s).

It can be seen from the above embodiment that when an S-GW of the secondary base station is integrated into the master base station, the uplink and downlink addresses may be exchanged by using the above flow. In comparison with the flowchart of signaling shown FIG. 3, the flow of exchange is simplified, and signaling overhead is lowered.

In this embodiment, when the master base station sends the uplink address and the downlink address to an MME via the secondary base station, the method may further include: the secondary base station receives the uplink address and the downlink address sent by the master base station; and sends the uplink address and the downlink address to the MME.

In this embodiment, the secondary base station may directly send the uplink address and the downlink address to the MME.

In above embodiments 1 and 2, the uplink address contained in the request message is further configured to indicate the secondary base station not to acquire a corresponding address by using a flow in an existing mechanism when the request message is received, that is, the corresponding address is acquired from the S-GW without needing an MME. Hence, the flow of address exchange may be simplified, and signaling overhead may be lowered.

Furthermore, the uplink address is not needed for indication, identification information may be added into the request message; and by indicating of the identification information, the secondary base station is configured to acquire a corresponding address from a serving gateway without needing the MME.

Embodiment 3

This embodiment shall be described taking address exchange in a connection establishment process in a core network structure as an example. In the core network structure, functions of an S-GW of a Secondary base station are integrated into a master base station.

Figure 6:
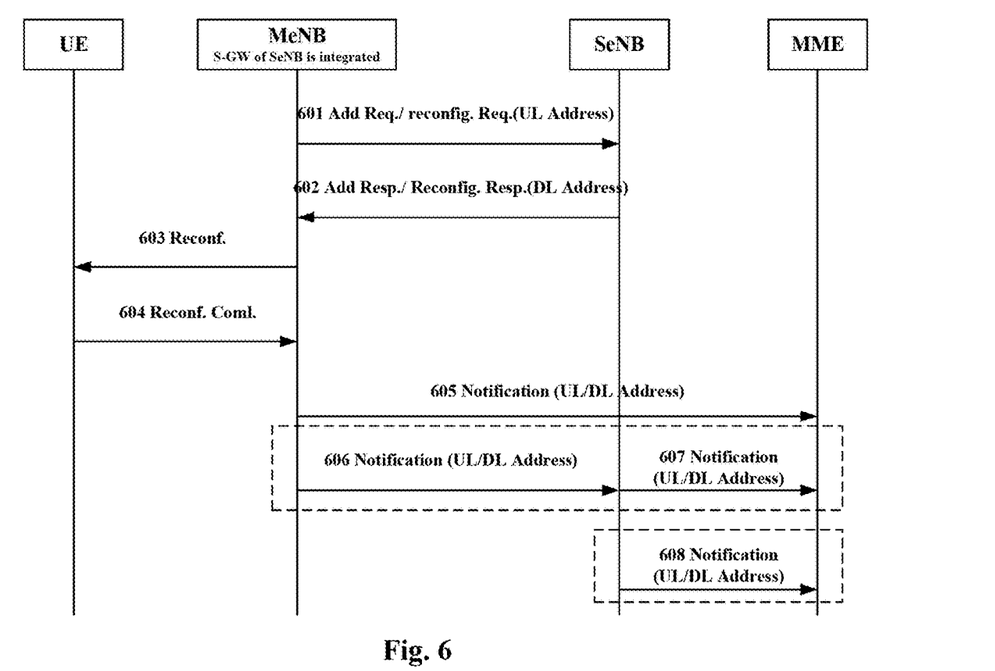
FIG. 6 is a flowchart of information exchange of Embodiment 3 of the present disclosure.

FIG. 6 is a flowchart of the information exchange method of Embodiment 3 of the present disclosure. As shown in FIG. 6, the method includes:

step 601: a master base station sends a request message to a secondary base station, the request message containing an uplink address of the master base station for receiving uplink data of service(s) of a UE in the secondary base station;

in this embodiment, an add request message may be adopted as the request message, the add request message being used to add a new service for the UE in the SeNB; in this embodiment, the uplink address is contained in the message and sent to the SeNB; furthermore, a reconfiguration request message may be adopted as the request message, the message being used to reconfigure a service of the UE existing in the SeNB; however, it is not limited to the above request messages, and any existing or newly-added message may be adopted;

step 602: the secondary base station receives the request message, and feeds back a response message according to information contained in the request message, the response message containing a downlink address of the secondary base station for receiving downlink data of the service(s);

in this embodiment, the response message may be an add response message or a reconfiguration response message; and furthermore, any existing or newly-added message may be adopted;

in this embodiment, when the request message contains the uplink address, the secondary base station may determine to acquire a corresponding address from an S-GW, without needing an MME, such as exchanging address information without needing to adopt a flow of an existing mechanism (as shown in FIG. 3), and exchange address information by adopting the flow of the embodiment of the present disclosure; and if the request message does not contain the uplink address, the secondary base station may determine to acquire a corresponding address from an S-GW via an MME by adopting a flow of an existing mechanism, so as to exchange address information;

step 603: the master base station sends a connection reconfiguration (Reconf.) message to the UE;

the secondary base station may be configured via the message, such as configuring an air-interface parameter, etc., which is similar to the relevant art, and shall not be described herein any further;

step 604: the UE feeds back a connection reconfiguration complete (Reconf.Coml.) message to the master base station after receiving the Reconf. message.

In this embodiment, the method further includes:

step 605: the master base station notifies the uplink address and the downlink address to the MME.

In this embodiment, the MME may be notified via a notification message.

Furthermore, the master base station may send the uplink address and the downlink address to the MME via the SeNB, and in such a case, the method may include:

step 606: the master base station sends the uplink address and the downlink address to the SeNB; and step 607: the SeNB sends the uplink address and the downlink address to the MME.

As shown in FIG. 6, as the secondary base station also leans the uplink address and the downlink address, the secondary base station may directly send the uplink address and the downlink address to the MME (see step 608).

It can be seen from the above embodiment that the address information may be exchanged in steps 601 and 602, which may simplify the flow of address exchange, and lower signaling overhead. The master base station may notify the uplink address and the downlink address to the UE and the MME, and connection in the core network may be established. And in this embodiment, the secondary base station may determine an information exchange mechanism using the embodiment of the present disclosure by using "the uplink address" in the request message, and does not use an existing mechanism to exchange address information.

Embodiment 4

Figure 7:
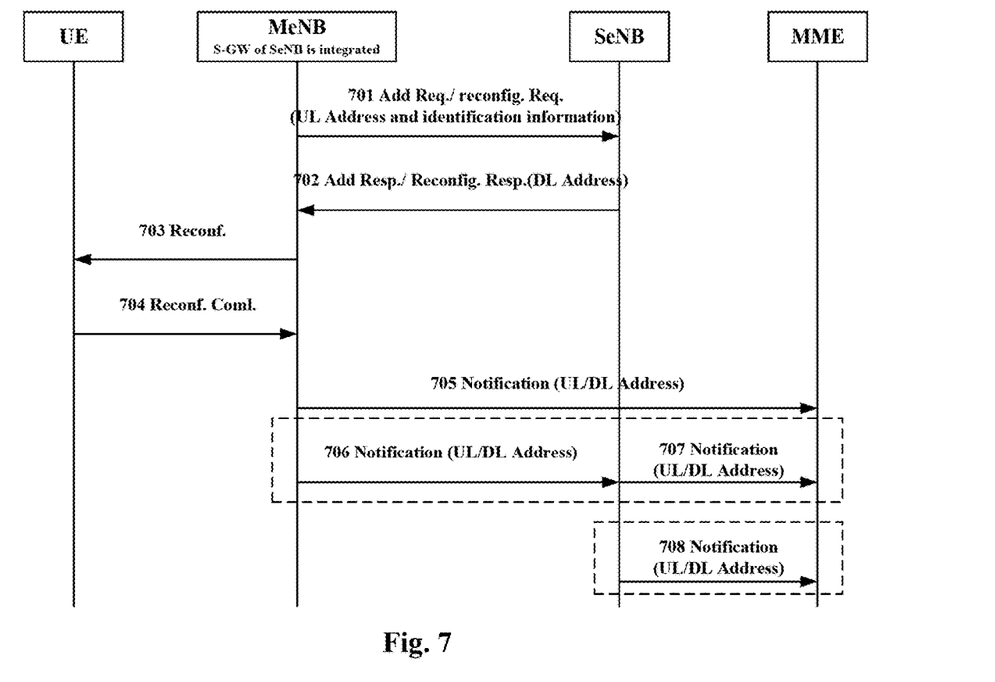
FIG. 7 is a flowchart of information exchange of Embodiment 4 of the present disclosure.

FIG. 7 is a flowchart of information exchange method of Embodiment 4 of the present disclosure, which is different from Embodiment 3 in that identification information is used to indicate the secondary base station to acquire a corresponding address from an S-GW, without needing an MME.

As shown in FIG. 7, the method includes the steps of:

step 701: a master base station sends a request message to a secondary base station, the request message containing an uplink address and identification information; the uplink address is identical to those in embodiments 1-3, and the identification information is used to indicate to acquire a corresponding address from a serving gateway without needing an MME when the request message is received, that is, the identification information indicates that the flow of this embodiment may be adopted, without needing to adopt a flow of an existing mechanism.

If the request message does not contain the identification information, or contains information using a flow of an existing mechanism, that is, acquiring a corresponding address from a serving gateway via an MME, the secondary base station may determine to use a flow of an existing mechanism to exchange address information.

Steps 702-708 are similar to steps 602-608 in Embodiment 3, which shall not be described herein any further.

It can be seen from the above embodiment that with the embodiment of the present disclosure, the existing flow of address exchange may be simplified, and signaling overhead may be lowered. The master base station may notify the uplink address and the downlink address to the UE and the MME, and connection in the core network may be established. And in this embodiment, the secondary base station may determine to acquire a corresponding address from an S-GW, without needing an MME, that is, the information exchange mechanism of the embodiment of the present disclosure is adopted, and an existing mechanism is not adopted for address information exchange.

Embodiment 5

Figure 8:
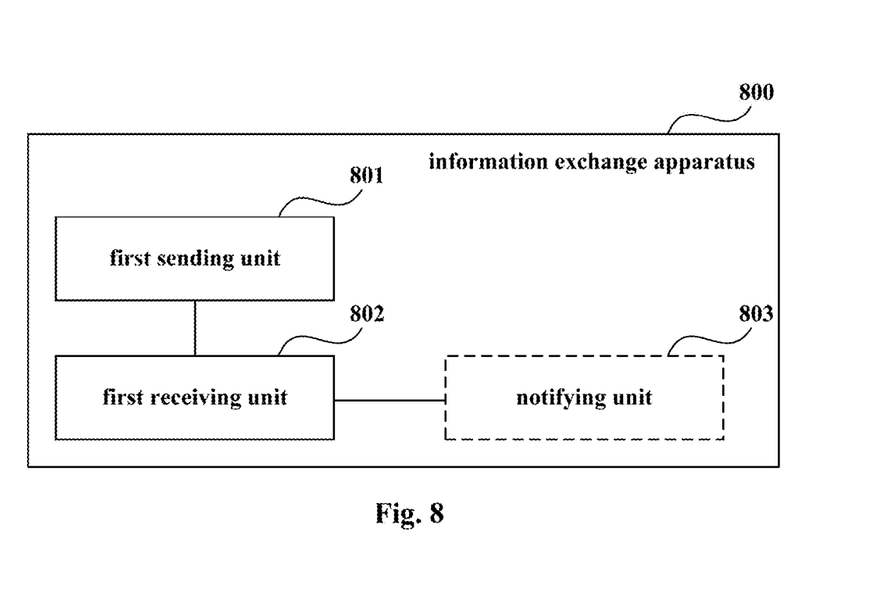
FIG. 8 is a schematic diagram of a structure of the information exchange apparatus of Embodiment 5 of the present disclosure.

FIG. 8 is a schematic diagram of a structure of the information exchange apparatus of Embodiment 5 of the present disclosure. As shown in FIG. 8, the apparatus 800 includes: a first sending unit 801 and a first receiving unit 802;

the first sending unit 801 is configured to send a request message to a secondary base station, the request message containing an uplink address of a master base station for receiving uplink data of service(s) of a UE in the secondary base station; and the first receiving unit 802 is configured to receive a response message fed back by the secondary base station according to the request message, the response message containing a downlink address of the secondary base station for receiving downlink data of the service(s).

With the apparatus of the embodiment of the present disclosure, an existing flow of address exchange may be simplified, and signaling overhead may be lowered.

In this embodiment, as shown in FIG. 8, the apparatus 800 may further include a notifying unit 803 configured to notify the uplink address and the downlink address to an MME or the secondary base station, so as to establish connection in a core network structure. The notifying unit 803 is optional, which is shown in a frame of dotted lines.

In this embodiment, the apparatus 800 is arranged at a master base station side, and the master base station integrates functions of an S-GW of the secondary base station. Furthermore, the apparatus may be integrated into the master base station. An operational flow of the apparatus 800 is similar to those in Embodiment 1 shown in FIG. 4 and embodiments 3 and 4 shown in FIGS. 6 and 7, which shall not be described herein any further.

In the above embodiment, the request message sent by the first sending unit 801 contains an uplink address, and when the secondary base station receives the request message containing the uplink address, it may determine to acquire a corresponding address from the S-GW, without needing an MME, that is, it determines to exchange address information by using the flow of the embodiment of the present disclosure, but not exchange address information by using a flow of an existing mechanism. And if the request message contains no uplink address, the secondary base station may determine to acquire a corresponding address from the S-GW via an MME, that is, a flow of an existing mechanism is used.

In this embodiment, besides adopting the above manner to indicate a flow of which mechanism shall be used by the secondary base station to exchange address information, identification information may further may adopted to indicate whether to acquire a corresponding address from the S-GW via an MME, that is, which flow is to be used to exchange address information. Hence, besides said uplink address, the request message sent by the first sending unit 801 may further include identification information for indicating the secondary base station to acquire a corresponding address from a serving gateway without needing the MME when the request message is received. That is, the secondary base station may determine to adopt the flow of the embodiment of the present disclosure to exchange address information according to the identification information, without needing to adopt a flow of an existing mechanism.

If the request message does not contain the identification information, or contains identification information for indicating to acquire a corresponding address from a serving gateway via an MME, the secondary base station may determine to acquire a corresponding address from the serving gateway via the MME, that is, a flow of an existing mechanism is used to exchange address information.

With the apparatus of the embodiment of the present disclosure, the secondary base station may further be indicated to use the method of the embodiment of the present disclosure to exchange addresses, thereby simplifying an existing flow of address exchange, and lowering signaling overhead.

Embodiment 6

Figure 9:
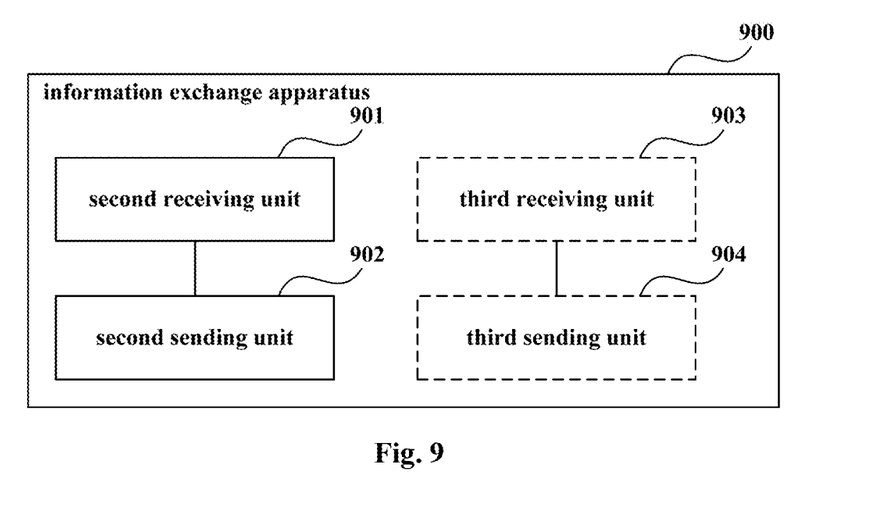
FIG. 9 is a schematic diagram of a structure of the information exchange apparatus of Embodiment 6 of the present disclosure.

FIG. 9 is a schematic diagram of a structure of the information exchange apparatus of an embodiment of the present disclosure. As shown in FIG. 9, the apparatus 900 includes: a second receiving unit 901 and a second sending unit 902;

the second receiving unit 901 is configured to receive a request message sent by a master base station, the request message containing an uplink address of the master base station for receiving uplink data of service(s) of a UE in a secondary base station; and the second sending unit 902 is configured to feed back a response message to the master base station according to information contained in the request message, the response message containing a downlink address of the secondary base station for receiving downlink data of the service(s).

With the apparatus of the embodiment of the present disclosure, an existing flow of address exchange may be simplified, and signaling overhead may be lowered.

In this embodiment, an add request message or a configuration request message may be used as the request message, which is as described in embodiments 1-5, and shall not be described herein any further. Furthermore, the request message may contain an uplink address, and it may be determined according to the uplink address to adopt the flow of this embodiment to exchange addresses, but not adopt a flow of an existing mechanism, that is, an address may be acquired from an S-GW, without needing an MME, thereby simplifying the flow.

In this embodiment, if identification information is adopted to indicate which exchange mechanism is used, the request message may further include identification information for indicating to acquire an address from a serving gateway without needing an MME when the request message is received, which is as described in embodiments 4-5, and shall not be described herein any further.

In this embodiment, after feeding the response message back to the master base station, the uplink address and the downlink address sent by the master base station may be received, and the uplink address and the downlink address may be sent to the MME. In such a case, the apparatus 900 may further include a third receiving unit 903 and a third sending unit 904; the third receiving unit 903 is configured to receive the uplink address and the downlink address sent by the master base station; and the third sending unit 904 is configured to send the uplink address and the downlink address to the MME. Both the third receiving unit 903 and the third sending unit 904 are optional.

In this embodiment, the apparatus 900 may further include a notifying unit (not shown) configured to notify the MME of the uplink address and the downlink address. The notifying unit is also optional.

In this embodiment, the apparatus 900 is arranged at a secondary base station side. Furthermore, the apparatus may be integrated into the secondary base station. An operational flow of the apparatus 900 is similar to those in Embodiment 2 shown in FIG. 5 and embodiments 3 and 4 shown in FIGS. 6 and 7, which shall not be described herein any further.

Embodiment 7

Embodiment 7 of the present disclosure further provides a base station, which corresponds to a master base station, integrates functions of an S-GW of a secondary base station, and includes the information exchange apparatus 800 described in Embodiment 5.

Figure 10:
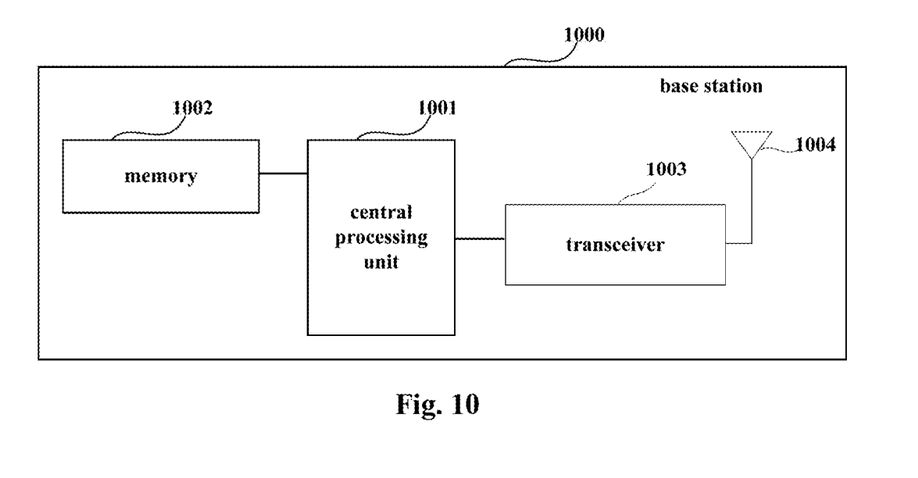
FIG. 10 is a schematic diagram of a structure of the master base station of Embodiment 7 of the present disclosure.

FIG. 10 is a schematic diagram of a structure of the base station of Embodiment 7 of the present disclosure. As shown in FIG. 10, the base station 1000 may include a central processing unit (CPU) 1001 and a memory 1002, the memory 1002 being coupled to the central processing unit 1001. The memory 1002 may store various data; and furthermore, it may store a program for information processing, and execute the program under control of the central processing unit 1001, so as to receive various information transmitted by the UE and the secondary base station, and transmit various information to the secondary base station, the UE and the MME.

In an implementation, the functions of the apparatus 800 may be integrated into the central processing unit 1001. The central processing unit 1001 may be configured to: send a request message to the secondary base station, the request message containing an uplink address of the master base station for receiving uplink data of service(s) of the UE in the secondary base station; and receive a response message fed back by the secondary base station according to the request message, the response message containing a downlink address of the secondary base station for receiving downlink data of the service(s).

Furthermore, the central processing unit 1001 may be configured to notify the uplink address and the downlink address to an MME or the secondary base station.

In another implementation, the apparatus 800 and the central processing unit may be configured separately. For example, the apparatus 800 may be configured as a chip connected to the central processing unit 1001, with its functions being realized under control of the central processing unit 1001.

In this embodiment, the memory 1002 may store the above uplink address and downlink address.

Furthermore, as shown in FIG. 10, the base station may include a transceiver 1003, and an antenna 1004, etc.; functions of the above components are similar to those of the relevant art, and shall not be described herein any further. It should be noted that the base station 1000 does not necessarily include all the parts shown in FIG. 10, and furthermore, the base station 1000 may include parts not shown in FIG. 10, and the relevant art may be referred to.

Embodiment 8

Embodiment 8 of the present disclosure further provides a base station, which is a secondary base station, and includes the information exchange apparatus 900 described in Embodiment 6.

FIG. 10 may be referred to for an example of the base station of Embodiment 8. The base station may include a central processing unit (CPU) and a memory, the memory being coupled to the central processing unit. The memory may store various data; and furthermore, it may store a program for information processing, and execute the program under control of the central processing unit, so as to receive information transmitted by a master base station, and transmit various information to the master base station and an MME.

In an implementation, the functions of the apparatus 900 may be integrated into the central processing unit. The central processing unit may be configured to: receive a request message sent by the master base station, the request message containing an uplink address of the master base station for receiving uplink data of service(s) of a UE in the secondary base station; and feed back a response message to the master base station according to information contained in the request message, the response message containing a downlink address of the secondary base station for receiving downlink data of the service(s).

Furthermore, the central processing unit may be configured to: receive the uplink address and the downlink address sent by the master base station; and send the uplink address and the downlink address to the MME.

In another implementation, the apparatus 900 and the central processing unit may be configured separately. For example, the apparatus 900 may be configured as a chip connected to the central processing unit, with its functions being realized under control of the central processing unit.

In this embodiment, the memory may store the above uplink address and downlink address.

Furthermore, the base station may include a transceiver, and an antenna, etc.; functions of the above components are similar to those of the relevant art, and shall not be described herein any further. It should be noted that the base station does not necessarily include all the parts shown in FIG. 10, and furthermore, the base station may include parts not shown in FIG. 10, and the relevant art may be referred to.

Embodiment 9

Figure 11:
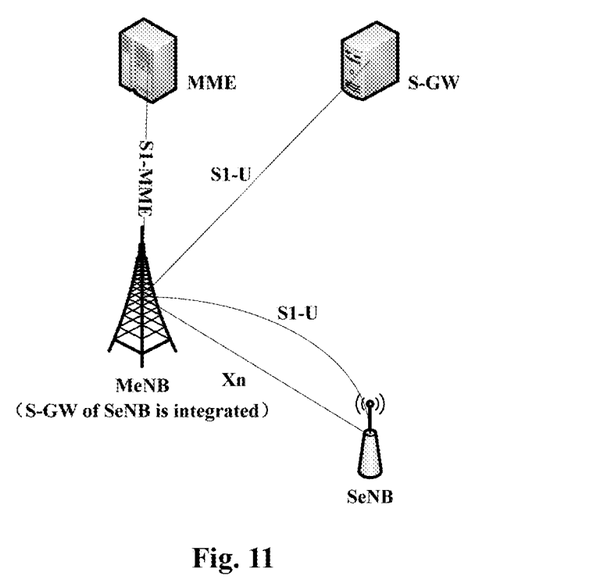
FIG. 11 is a schematic diagram of a structure of the communication system of Embodiment 9 of the present disclosure.

FIG. 11 is a schematic diagram of a structure of the communication system of Embodiment 9 of the present disclosure. As shown in FIG. 11, the system includes a master base station (MeNB) integrating functions of an S-GW of a secondary base station (SeNB), the SeNB, an MME, and the S-GW;

the master base station is configured to send a request message to the secondary base station, the request message containing an uplink address of the master base station for receiving uplink data of service(s) of a UE in the secondary base station, and receive a response message fed back by the secondary base station according to the request message, the response message containing a downlink address of the secondary base station for receiving downlink data of the service(s);

and the secondary base station is configured to receive the request message sent by the master base station, the request message containing the uplink address of the master base station for receiving the uplink data of the service(s) of the UE in the secondary base station, and feed back the response message to the master base station according to information contained in the request message, the response message containing the downlink address of the secondary base station for receiving the downlink data of the service(s).

In this embodiment, the MME may receive the uplink and downlink addresses sent by the master base station or the secondary base station.

In this embodiment, a structure of the master base station is as that of the base station described in Embodiment 7, and a structure of the secondary base station is as that of the base station described in Embodiment 8, with their operational flows being as shown in FIGS. 6 and 7, and being not going to be described herein any further.

With the method of the embodiment of the present disclosure, an existing flow of information exchange may be simplified, signaling overhead may be lowered, and problems existing in the relevant art may be solved. Furthermore, the master base station may indicate which mechanism is to be used by the secondary base station for performing information exchange via the information contained in the indication information or request message. And furthermore, the master base station or the secondary base station may notify the uplink and downlink addresses to the MME, so as to establish connection in a core network structure.

An embodiment of the present disclosure further provides a computer-readable program, when the program is executed in an information exchange apparatus or a master base station, the program enables a computer to carry out the information exchange method as described in embodiments 1 and 3-4 in the information exchange apparatus or the master base station.

An embodiment of the present disclosure provides a storage medium in which a computer-readable program is stored, the computer-readable program enables a computer to carry out the information exchange method as described in embodiments 1 and 3-4 in an information exchange apparatus or a master base station.

An embodiment of the present disclosure further provides a computer-readable program, when the program is executed in an information exchange apparatus or a secondary base station, the program enables a computer to carry out the information exchange method as described in embodiments 2 and 3-4 in the information exchange apparatus or the secondary base station.

An embodiment of the present disclosure provides a storage medium in which a computer-readable program is stored, the computer-readable program enables a computer to carry out the information exchange method as described in embodiments 2 and 3-4 in an information exchange apparatus or a secondary base station.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

What is claimed is:

1. An information exchange apparatus, comprising:
   a memory configured to store a plurality of instructions; and
   a processor circuit coupled to the memory and configured to execute the plurality of instructions to:
   send a request message to a secondary base station, the request message containing an uplink address of a master base station for receiving uplink data of service(s) of a user equipment in the secondary base station, wherein the uplink address is used to indicate to the secondary base station information about a corresponding address from a serving gateway; and
   receive a response message fed back by the secondary base station according to the request message, the response message containing a downlink address of the secondary base station for receiving downlink data of the service(s).

2. The information exchange apparatus according to claim 1, wherein the processor circuit is further configured to notify the uplink address and the downlink address to a mobility management entity (MME) or the secondary base station.

3. The information exchange apparatus according to claim 1, wherein the request message further comprises identification information for indicating the secondary base station to acquire the corresponding address from the serving gateway without needing a MME when the request message is received.

4. The information exchange apparatus according to claim 1, wherein the master base station integrates a serving gateway function of the secondary base station.

5. An information exchange apparatus, comprising:
   a memory configured to store a plurality of instructions; and
   a processor circuit coupled to the memory and configured to execute the plurality of instructions to:
   receive a request message sent by a master base station, the request message containing an uplink address of the master base station for receiving uplink data of service(s) of a user equipment in a secondary base station, wherein the uplink address is used to indicate to the secondary base station information about a corresponding address from a serving gateway; and feed back a response message to the master base station according to information contained in the request message, the response message containing a downlink address of the secondary base station for receiving downlink data of the service(s).

6. The information exchange apparatus according to claim 5, wherein the request message further comprises identification information for indicating to acquire a corresponding address from a serving gateway without needing an MME when the request message is received.

7. The information exchange apparatus according to claim 5, wherein the processor circuit is further configured to:
receive the uplink address and the downlink address sent by the master base station; and
send the uplink address and the downlink address to a MME.

8. The information exchange apparatus according to claim 5, wherein the master base station integrates a serving gateway function of the secondary base station.

9. A communication system, comprising:
a master base station; and
a secondary base station; wherein,
the master base station is configured to send a request message to the secondary base station, the request message containing an uplink address of the master base station for receiving uplink data of service(s) of a user equipment in the secondary base station, wherein the uplink address is used to indicate to the secondary base station information about a corresponding address from a serving gateway, and receive a response message fed back by the secondary base station according to the request message, the response message containing a downlink address of the secondary base station for receiving downlink data of the service(s);

and the secondary base station is configured to receive the request message sent by the master base station, and feed back the response message to the master base station according to information contained in the request message.

10. The communication system according to claim 9, wherein the master base station integrates a serving gateway function of the secondary base station.

11. The communication system according to claim 9, wherein the system further comprises an MME; and the master base station is further configured to send the uplink address and the downlink address to the secondary base station or the MME, or the secondary base station sends the uplink address and the downlink address to the MME.

12. The communication system according to claim 9, wherein the request message further comprises identification information for indicating to acquire a corresponding address from a serving gateway without needing an MME when the request message is received.

* * * * *